Patented Nov. 28, 1939

2,181,823

UNITED STATES PATENT OFFICE 2,181,823

PRODUCTION OF ALKYLATED PHENOLS

Donald R. Stevens, Swissvale, and Joseph E. Nickels, Pittsburgh, Pa., assignors to Gulf Research & Development Company, Pittsburgh, Pa., a corporation of Delaware No Drawing. Application April 11, 1938, Serial No. 201,458

6 Claims. (Cl. 260—624)

This invention relates to the production of alkylated phenols; and it comprises a method for the alkylation of phenolic compounds with olefins in the presence of a sulfuric acid catalyst, in which the polymerizing action of the sulfuric acid on the olefin is substantially suppressed by incorporating in the sulfuric acid a substantial amount of a sulfate of an alkali such as sodium, potassium or ammonium sulfate; all as more fully hereinafter set forth and as claimed.

The alkylated phenols have found extended application in the prevention of oxidational changes in various organic materials such as various petroleum and other hydrocarbon products, rubber and the like. They have been found particularly suitable for use as antioxidants for gasolines produced by cracking petroleum oil or by polymerizing normally gaseous hydrocarbons, which gasolines contain substantial amounts of constituents having a tendency to oxidize and form undesirable gums.

In general the alkylated phenols may be produced directly by treating a suitable phenol or phenol substitution product with an olefin, particularly an iso-olefin such as isobutylene or iso-amylene, in the presence of sulfuric acid at temperatures up to about 70° C. However, in the production of alkylated phenols from some phenolic compounds which are particularly stable or which have relatively high melting points, it is sometimes necessary or desirable to carry out the alkylation reaction at elevated temperatures under pressure in order to effect satisfactory alkylation in a reasonable length of time. Whether the reaction is carried out at temperatures of 70° C. or less, or at elevated temperatures under pressure, more or less of the olefin used is polymerized instead of reacting with the phenolic compound to produce an alkylated phenol. This polymerization of the olefin is, as a rule, not objectionable, provided the polymers are not formed in an excessive amount. However, particularly in those cases where the alkylation is carried out at higher temperatures and under pressure, the amount of olefin polymerized is often quite large and may be so large as to affect adversely the yield of alkylated phenol. It is therefore often desirable that the polymerization of the olefin be suppressed during the alkylation of a phenolic material with an olefin in the presence of a sulfuric acid catalyst. This result is accomplished by the method of our invention.

This invention is predicated upon the discovery that the alkali salts of sulfuric acid when combined with sulfuric acid, particularly concentrated sulfuric acid, have the property of decreasing the catalytic effect of the latter on the polymerization of olefins and that the mixture of sulfuric acid and alkali sulfate thus produced is an effective catalyst in the alkylation of phenols with olefins. Thus by carrying out the alkylation of phenolic materials with olefins according to the method of our invention, in which the phenolic material and the olefin are contacted with a catalyst comprising concentrated sulfuric acid and a sulfuric acid salt of an alkali such as a sodium, potassium or ammonium salt, we are able to control the amount of polymer formed, and particularly, in cases of alkylation of phenolic compounds which are difficult to alkylate, we are able to carry out the alkylation at elevated temperatures under pressure without the formation of excessive amounts of olefin polymer.

The degree to which the polymerizing action of the sulfuric acid is suppressed depends to some extent upon the concentration of the acid, the percentage of alkali sulfate added and the temperature of reaction. For example, with any given concentration of acid, the amount of sulfate added should be increased in general with higher temperatures of reaction in order to suppress the polymerization to the same degree. When using concentrated sulfuric acid, effective suppression of polymerization may be obtained by incorporating therein amounts of alkali sulfate as low as 10 per cent of the weight of the acid. Additions of sulfate in such low amounts are particularly effective when operating in the lower temperature ranges such as between 70° and 100° C. When it is found necessary or desirable to effect the alkylation at an elevated temperature under pressure, that is to say at temperatures above about 100° C., effective suppression of the polymerization of the olefin generally requires the use of larger percentages of sulfate. When operating at temperatures up to about 150° C. best results are usually obtained with concentrations of alkali sulfate up to about 60 per cent of saturation, although at higher temperatures amounts of alkali sulfate up to the saturation limit may be used. It is generally undesirable to use an amount of alkali sulfate in excess of that required to effect maximum suppression of polymerization at any given temperature, as such excess will tend to decrease the alkylation of the phenol.

The alkali sulfate may be added as such to the sulfuric acid or the sulfuric acid may be treated with a compound of the alkali such as sodium, potassium, or ammonium hydroxide or carbonate, to form in solution in the acid the required amount of the alkali sulfate. In most cases it is more convenient simply to add sodium, potassium or ammonium sulfate to the sulfuric acid. When concentrated sulfuric acid is used as the catalyst, ammonium sulfate added to the sulfuric acid solution has given good results.

The sulfuric acid solution used may, of course, be a solution of any concentration which is useful to catalyze the alkylation of a phenol with an olefin. With the higher concentrations of acid which normally tend to produce more polymerization, the addition of the alkali sulfate according to the method of our invention is particularly useful. We have found, for example, that the addition of an alkali sulfate to a sulfuric acid solution containing 80 per cent to 100 per cent $H_2SO_4$, in amounts up to the saturation limit, produces particularly satisfactory catalysts. Commercial concentrated sulfuric acid about 60 per cent saturated with ammonium sulfate, for example, produces good yields of alkylated phenols without excessive polymerization when used at temperatures as high as 150° C.

The alkali sulfate-sulfuric acid mixture is generally used in relatively small amounts. Amounts corresponding to about 5 per cent by weight of the phenolic material being alkylated have given good results. However, larger or smaller amounts may be used when desirable with modified conditions of temperature and time of reaction.

While the method of this invention may be applied to the alkylation of a phenolic material with substantially any iso-olefin to prevent excessive polymerization of the olefin, it is particularly useful in the alkylation of phenolic materials with isobutylene. Isobutylene has a marked tendency to polymerize in the presence of sulfuric acid, particularly at temperatures above about 70° C. It is often useful to effect the butylation of phenolic materials at temperatures above this point in order to accelerate the reaction, particularly with compounds which are difficult to alkylate. In such cases, the isobutylene may tend to polymerize to the exclusion of the alkylation of the phenolic material. If, however, the reaction is carried out in the presence of a mixture of sulfuric acid and an alkali sulfate, the polymerization can be sufficiently suppressed to permit the alkylation of the phenolic material.

For example, the alkylation of para-hydroxy-diphenyl with isobutylene for the production of 2,6-di-tertiary-butyl-4-phenyl-phenol requires somewhat drastic reaction conditions in order to effect the reaction in a reasonable time. When it is attempted to carry out this reaction at temperatures above about 100° C., using concentrated sulfuric acid as the catalyst, the major part of the isobutylene is polymerized and very little butylation of the hydroxy-diphenyl occurs. On the other hand, by using concentrated sulfuric acid about 60 per cent saturated with an alkali sulfate, in amounts corresponding to about 5 per cent of the hydroxy-diphenyl, we have been able to butylate it and produce good yields of 2,6-di-tertiary-butyl-4-phenyl-phenol in one hour at a temperature of about 150° C. and a pressure of 170 pounds.

In the following example a comparison is made of the results obtainable when 2,6-di-tertiary-butyl-4-phenyl-phenol is produced by the alkylation of para-hydroxy-diphenyl in the presence of a plain sulfuric acid catalyst and in the presence of a sulfuric acid catalyst about 60 per cent saturated with ammonium sulfate.

In each case 30 parts by weight of para-hydroxy-diphenyl and 80 parts by weight of isobutylene were placed in a pressure vessel. Into one vessel there was introduced commercial concentrated sulfuric acid in an amount corresponding to about 5 per cent by weight of the para-hydroxy-diphenyl, and a corresponding amount of commercial concentrated sulfuric acid about 60 per cent saturated with ammonium sulfate was placed in the other vessel. Both vessels were then heated to 150° C. and maintained at that temperature for 70 minutes, the mixture in the vessel being constantly agitated. The vessels were then cooled rapidly. An oily liquid reaction product was then separated out, washed with dilute aqueous alkali solution and the washed product was fractionally distilled to separate the polymer fraction from the 2,6-di-tertiary-butyl-4-phenyl-phenol. Unreacted isobutylene and para-hydroxy-diphenyl were also recovered and measured. The results obtained are shown in the following table:

| Catalyst used | $H_2SO_4$ alone | $H_2SO_4$ about 60% saturated with $(NH_4)_2SO_4$ |
|---|---|---|
| Unreacted isobutylene_____grams__ | 3 | 18.3 |
| Unreacted para-hydroxy-diphenyl____do____ | 3 | 7.7 |
| Liquid reaction product _____do____ | 108 | 89.5 |
| Polymer in reaction product_____do____ | 58.5 | 25.0 |
| Alkylated phenol in reaction product_do____ | 37.3 | 28.8 |
| Isobutylene in polymer_____percent__ | 75.8 | 40.5 |
| Isobutylene in alkylated phenol_____do____ | 19.6 | 18.5 |
| Polymer in liquid product _____do____ | 54.1 | 27.9 |
| Alkylated phenol in liquid product___do____ | 34.5 | 32.2 |
| Ratio: Percent polymer in liquid product to percent alkylated phenol in liquid product_____ | 1.57 | 0.87 |

It is readily apparent from these results that the polymerization of the isobutylene has been very materially reduced by the use of the ammonium sulfate in the sulfuric acid catalyst. At the same time the percentage of isobutylene going to the alkylation of the phenol remains substantially the same and the percentage of alkylated phenol in the liquid end-product is modified very little. Thus by the use of a catalyst comprising sulfuric acid and ammonium sulfate according to our invention an end-product is obtained having a lower ratio of polymer to alkylated phenol.

What we claim is:

1. A process for the production of mono-hydroxy phenolic compounds alkylated in the hydroxylated nucleus comprising heating a mixture of an olefin and a mono-hydroxy phenolic compound in the presence of a solution of an alkali sulfate in sulfuric acid.

2. A process for the production of mono-hydroxy phenolic compounds alkylated in the hydroxylated nucleus comprising heating under pressure a mixture of an olefin and a mono-hydroxy phenolic compound in the presence of a solution of an alkali sulfate in sulfuric acid.

3. A process for the production of mono-hydroxy phenolic compounds alkylated in the hydroxylated nucleus comprising heating at a temperature above about 100° C. a mixture of an olefin and a mono-hydroxy phenolic compound in the presence of a solution of an alkali sulfate in sulfuric acid.

4. A process for the production of mono-hydroxy phenolic compounds alkylated in the hydroxylated nucleus comprising heating at a temperature above about 100° C. a mixture of an olefin and a mono-hydroxy phenolic compound in the presence of a solution in sulfuric acid in amounts up to 60 per cent saturation of ammonium sulfate.

5. A process for the production of a dialkyl-mono-phenyl-phenol comprising heating at a temperature above about 100° C. a mixture of an olefin and a mono-hydroxy-diphenyl in contact with a solution of an alkali sulfate in sulfuric acid.

6. A process for the production of 2,6-di-tertiary-butyl-4-phenyl-phenol comprising heating at a temperature of about 150° C. a mixture containing isobutylene and para-hydroxy-diphenyl in contact with a solution of sulfuric acid about 60 per cent saturated with ammonium sulfate.

DONALD R. STEVENS.
JOSEPH E. NICKELS.